(12) United States Patent
Piippo et al.

(10) Patent No.: US 10,126,150 B2
(45) Date of Patent: Nov. 13, 2018

(54) METHOD AND APPARATUS FOR ESTIMATING AN ANGLE OFFSET OF AN ANGLE SENSOR

(71) Applicant: ABB Technology Oy, Helsinki (FI)

(72) Inventors: Antti Piippo, Espoo (FI); Matti Eskola, Espoo (FI); Samuli Kallio, Helsinki (FI)

(73) Assignee: ABB Schweiz AG, Baden (CH)

( * ) Notice: Subject to any disclaimer, the term of this patent is extended or adjusted under 35 U.S.C. 154(b) by 55 days.

(21) Appl. No.: 15/466,487

(22) Filed: Mar. 22, 2017

(65) Prior Publication Data

US 2017/0276519 A1    Sep. 28, 2017

(30) Foreign Application Priority Data

Mar. 24, 2016  (EP) .................................... 16162305

(51) Int. Cl.
    *G01D 5/244* (2006.01)
    *G01D 5/243* (2006.01)
    *H02P 6/15* (2016.01)
    *B66B 5/18* (2006.01)

(52) U.S. Cl.
    CPC .............. *G01D 5/2448* (2013.01); *B66B 5/18* (2013.01); *G01D 5/243* (2013.01); *H02P 6/15* (2016.02)

(58) Field of Classification Search
    CPC .............................. G01D 5/2448; G01D 5/243
    See application file for complete search history.

(56) References Cited

U.S. PATENT DOCUMENTS

| | | | |
|---|---|---|---|
| 6,046,555 A | 4/2000 | Szoboszlay | |
| 6,940,250 B2* | 9/2005 | Nishimura | H02P 21/08 318/432 |
| 7,023,170 B2* | 4/2006 | Yasukawa | H02P 27/04 318/705 |
| 8,476,851 B2* | 7/2013 | Kawai | H02P 6/15 318/400.01 |
| 9,190,948 B2* | 11/2015 | Blind | H02P 25/024 |
| 2003/0034751 A1 | 2/2003 | Walters | |
| 2015/0134284 A1* | 5/2015 | Negre | H02P 6/16 702/66 |

FOREIGN PATENT DOCUMENTS

DE    102013221709 A1    4/2015

OTHER PUBLICATIONS

European Patent Office, Search Report issued in corresponding Application No. 16162305.3, dated Sep. 9, 2016, 2 pp.

* cited by examiner

*Primary Examiner* — Walter L Lindsay, Jr.
*Assistant Examiner* — Milton Gonzalez
(74) *Attorney, Agent, or Firm* — J. Bruce Schelkopf; Taft Stettinius & Hollister LLP

(57) ABSTRACT

The present disclosure describes a two-stage method for estimating an angle offset of an angle sensor in a system comprising a permanent-magnet synchronous motor. An initial value for the estimated angle offset is first determined with a short circuit test. Next, a torque of the motor may be controlled so that the motor is maintained at a zero speed. Minor adjustments are made to the value of the angle offset to find a minimum magnitude of stator current. A value at which the stator current is at its minimum is used as a final angle offset.

20 Claims, 1 Drawing Sheet

METHOD AND APPARATUS FOR ESTIMATING AN ANGLE OFFSET OF AN ANGLE SENSOR

FIELD

The present invention relates to electric drive systems, and more particularly to estimating an angle offset of an angle sensor attached to a permanent-magnet synchronous machine.

BACKGROUND

Angle feedback is used in various electric drive applications. An elevator system may comprise such an electric drive, for example. A typical elevator system comprises an elevator car and a counterweight suspended on a cable that passes via a drive sheave. When the elevator is in use, an electric motor may drive an axle of the drive sheave in order to move the elevator car and the counterweight. When the elevator is not in use, a brake may be used to manually prevent rotation of the axle of the drive sheave.

The electric motor rotating the drive sheave may be an induction motor, for example. The rotational speed of the induction motor may be reduced to a level more suitable for an elevator by using a gear system. Alternatively, a slow-rotating, high-torque permanent-magnet synchronous motor may be used. Thus, the gear system can be left out and the motor can be attached directly to the axle of the drive sheave. In this manner, improvements in space requirements and cost-effectiveness of the elevator system can be achieved.

For safety reasons, and to guarantee a high-quality control, the control system a of permanent-magnet synchronous motor in an elevator application may be implemented as a torque control with an angle feedback from the rotor of the motor. However, after an angle sensor has been introduced into the system, the angle information produced by an angle sensor typically does not correspond with the actual rotor angle. Instead, there may be a constant angle offset between the sensed angle and the actual angle. This angle offset may have to be determined before the elevator can be used. After determining the angle offset, the offset may be added to the angle measured with the sensor during operation.

In general, an offset in a measurement of a rotor angle may be determined by applying a DC current to the motor and by assuming that the motor is able to align itself according to the applied current. The offset may then be determined from the difference between the angle of the applied DC current and the measured angle. However, this approach requires that the motor can turn freely. This may be problematic in elevator applications, for example, because mechanical installation of the motor may already have been done before the commissioning of a frequency converter.

Alternatively, a motor may be injected with a voltage stimulus and the actual rotor orientation may be determined from a current response induced by the stimulus. However, this approach requires a magnetically asymmetric (salient) permanent-magnet synchronous motor where the motor phase inductances are changing as a function of the rotor position. Thus, it is difficult to know beforehand if a certain motor is suitable for signal injection methods.

BRIEF DESCRIPTION

An object of the present invention is thus to provide a method and an apparatus for implementing the method so as to alleviate the above disadvantages. The objects of the invention are achieved by a method and an apparatus which are characterized by what is stated in the independent claims. Preferred embodiments of the invention are disclosed in the dependent claims.

The present disclosure describes a two-stage method for estimating an angle offset of an angle sensor in a system comprising a permanent-magnet synchronous motor. The permanent-magnet synchronous motor is configured to drive an axle, and the angle sensor is configured to sense a rotor angle of the motor. A brake may be used to prevent an axle driven by the motor from rotating when the system is not in use. When the brake is not applied, the axle is free to rotate in response to an external torque assumed to be acting on the axle.

In a first stage, an initial value for the estimated angle offset may be determined in a short-circuit test. Phases of the stator of the motor are controlled to a common potential (e.g. the positive or negative DC voltage level of a DC link of a frequency converter controlling the motor), and the brake is released. Because of the external torque, the axle starts to turn, and currents are induced into the stator phases. Based on these phase currents, a stator current vector may be determined. An initial value for the angle offset may then be determined by determining the angle of the stator current vector.

In a second stage, the presence of the external torque may be further utilized. The torque of the motor may be controlled so that it matches the external torque and the motor can be maintained at a zero speed. When the estimated angle offset corresponds with the actual rotor angle, the magnitude of the stator current is at its minimum. The minimum magnitude can be found by making minor adjustments to the value of the angle offset, starting from the initial value for the estimated angle offset, for example. Then, a final value for the estimated angle offset may be the value at which the stator current is at its smallest.

The method according to the present disclosure can be performed after the motor is already coupled to a load. The method is fast, so the movement during the method can be kept at a minimum. The method is also able to estimate the angle offset without knowing the motor parameters.

BRIEF DESCRIPTION OF THE DRAWINGS

In the following, the invention will be described in greater detail by means of the preferred embodiments and with reference to the accompanying drawings, in which.

DETAILED DESCRIPTION

The present disclosure describes a method for estimating an angle offset of an angle sensor. The angle sensor may be a part of a system comprising a permanent-magnet synchronous motor and a brake. The angle sensor may be configured to sense a rotor angle of the permanent-magnet synchronous motor. The motor may be a three-phase permanent-magnet synchronous motor driving an axle, for example. The brake may be coupled to the axle such that, when the brake is closed, the brake manually prevents the axle from rotating. The system is such that when the brake is open, the axle is free to rotate. The system also comprises a source for an external torque acting on the axle (in contrast to a torque induced by the motor).

Figure 1:
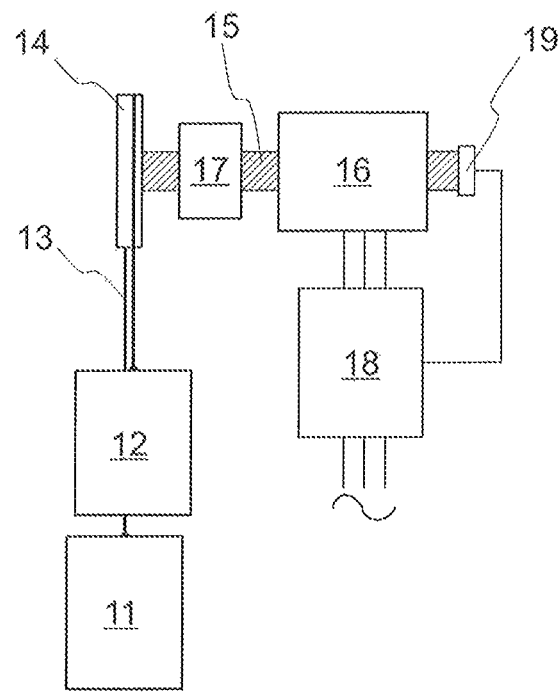
FIG. 1 shows an exemplary elevator system.

The system may be an elevator system comprising an elevator car and a counterweight suspended on a cable that passes via a drive sheave, for example. The permanent-magnet synchronous motor may drive an axle of the drive sheave, and the brake may be arranged to manually prevent the rotation of the axle of the drive sheave when the brake is closed. The elevator car and the counterweight may have a weight difference between each other so that when the brake is opened, an external torque is induced onto the axle of the drive sheave. FIG. 1 shows an exemplary elevator system. The elevator system comprises an elevator car 11 and a counterweight 12 that are suspended at the ends of a cable 13. The cable 13 is arranged to pass around a periphery of a drive sheave 14. An axle 15 of the drive sheave 14 is driven by a permanent-magnet synchronous motor 16. A brake 17 prevents the axle 15 from rotating when the elevator system is not in use. A frequency converter 18 controls the motor 16. In FIG. 1, the frequency converter 18 receives a measurement of the rotor angle of the motor 16 from an angle sensor 19.

The counterweight 12 may be fitted for an average load of the elevator car 11, so it may be heavier than the elevator car 11 when the elevator car 11 is empty. Thus, if the brake 17 is released when the elevator car 11 is empty, the counterweight 12 causes an external torque onto the motor through the drive sheave 14. The torque starts to pull the elevator car 11 upwards. The torque induced by the counterweight 12 may be 30 to 70 percent of a nominal torque of the motor 16, for example.

A method according to the present disclosure requires that the brake in the system can be opened while performing the method, and that the axle driven by the motor is allowed to turn slightly. In an elevator system, for example, this may mean that the elevator car may move slightly while performing the method.

The method according to the present disclosure comprises a first stage and then a second stage. In the first stage, a short-circuit test is performed in order to determine an initial value for the estimated angle offset. The phases of the stator of the motor are connected to the same voltage potential in order to short-circuit the stator of the motor. A frequency converter controlling the permanent-magnet synchronous motor may be used to accomplish this, for example. This voltage potential may be the positive DC voltage level, the negative DC voltage level or a neutral point of a DC link of the frequency converter, for example. If the frequency converter utilizes a space vector modulation scheme, an inverter bridge of the frequency converter may be controlled to produce a zero vector, for example.

The brake may then be opened, and because an external torque acts on the axle, the axle starts to rotate slowly. A rotating flux of the permanent magnet of the motor induces voltages and a stator current can be detected in the stator circuit when the stator circuit is short-circuited (by a frequency converter, for example). The stator current induced by the rotation of the axle may be determined, and an initial value for the angle offset may then be determined on the basis of the determined stator current. In this context, the term "stator current" refers to a current vector formed by stator phase currents of the motor. Currents of individual phases are referred to as "phase currents". The sum of phase currents is assumed to be zero. Embodiments of determining the initial value of the angle offset are discussed in more detail later in the present disclosure.

After the first stage, the second stage is initiated. In the second stage, a speed control may be initiated to hold the axle stationary. A corrected rotor angle may be calculated on the basis of the estimated angle offset and the rotor angle sensed with the angle sensor. The torque of the motor may be controlled to maintain the rotational speed of the motor at a zero speed. The control of the torque uses the corrected rotor angle as feedback.

The magnitude of the stator current is at its minimum when the estimated angle offset corresponds with the actual rotor angle. In order to find the minimum magnitude, minor adjustments may be made to the value of the estimated angle offset. A value of the angle offset at which the stator current is at its smallest may then be determined, and the determined value may be used as a final estimated angle offset. The brake may now be closed. If the angle sensor is an absolute sensor (in contrast to an incremental sensor), it may not be necessary to find the final estimated angle offset more than once. The final estimated angle offset determined with the method according to the present disclosure may be stored in a memory (in the frequency converter, for example). Also the second stage may be implemented in various ways. Some embodiments are discussed in more detail in the following paragraphs.

In one embodiment of the first stage, determining an angle of the stator current (in a stator reference frame) may comprise using a phase locked loop to lock to the stator current. The angle may then be determined with the phase locked loop. Alternatively, in another embodiment, the angle of the stator current may be determined directly from stator current components in the stator reference frame, if such components are readily available. An initial value for the estimated angle offset may then be determined on the basis of the stator current. Since the phases of the stator are short-circuited in the first stage, voltages between the phases are zero. Thus, components $u_d$ and $u_q$ of a stator voltage vector in a rotor reference frame can be represented by the following Equations:

$$u_d = 0 = Ri_d - \omega L_q i_q + \frac{d\psi_d}{dt}, \quad (1)$$

$$u_q = 0 = Ri_q + \omega(\Psi_{PM} + L_d i_d) + \frac{d\psi_q}{dt},$$

where subscript $_d$ denotes a direct (d) component in the rotor reference frame and subscript $_q$ denotes a quadrature (q) component in the rotor reference frame; i refers to the components of the stator current vector; L refers to the components of the inductance of the rotor; Ψ refers to the components of the stator flux; R denotes stator resistance; $\Psi_{PM}$ denotes the flux of the permanent magnet of the rotor; and ω represents the rotational speed of the rotor.

After instantaneous transient currents caused by switching the stator phases to a short circuit have died, the stator current may be assumed to change relatively slowly. Thus, the time derivatives of the flux in Equations (1) may be assumed to be small, and can be left out from Equations (1). As a result, the direct component $i_d$ and the quadrature component $i_q$ of the stator current in the rotor reference frame can be calculated as follows:

$$i_q \approx \frac{\omega \Psi_{PM} R}{R^2 + \omega^2 L_d L_q}, \quad (2)$$

$$i_d \approx \frac{\omega^2 \Psi_{PM} L_q}{R^2 + \omega^2 L_d L_q}.$$

However, because the rotor angle is yet unknown, it is not possible to calculate the d and q components in the rotor coordinates. In practice, only stator current components $i_x$ and $i_y$ in the stator reference frame may be available.

Figure 2:
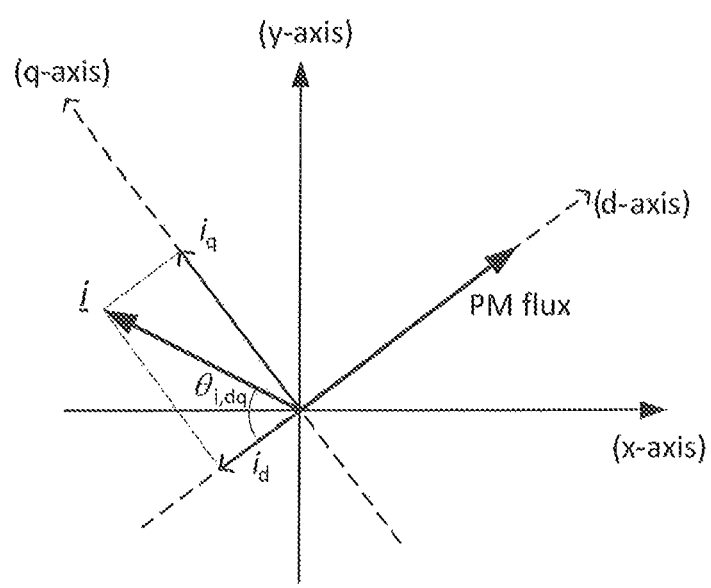
FIG. 2 shows a simplified diagram of a stator current being presented in a rotor reference frame and in a stator reference frame.

FIG. 2 shows a simplified diagram of the stator current being represented in the rotor reference frame and in the stator reference frame. In FIG. 2, the stator reference frame is shown with an x-axis and a y-axis that is perpendicular to the x-axis. The rotor reference frame is shown with a direct axis (d-axis) and a quadrature axis (q-axis) that is perpendicular to the d-axis. The direct axis is aligned with the permanent magnet (PM) flux of the motor. In FIG. 2, a stator current vector $\underline{i}$ is shown. The stator current vector $\underline{i}$ may represent sinusoidal phase currents of stator windings of a three-phase permanent-magnet synchronous motor, for example. The sum of the phase currents is assumed to be zero. FIG. 2 further shows a direct component $i_d$ and a quadrature component $i_q$ of the stator current vector. The direct component $i_d$ represents a projection of the stator current vector $\underline{i}$ on the d-axis, while the quadrature component $i_q$ represents a projection of the stator current vector $\underline{i}$ on the q-axis. The stator current vector and its direct component have an angle $\theta_{i,dq}$ between them. By determining this angle, an estimate of the angle offset can be produced.

The angle $\theta_{i,dq}$ between the stator current vector and its direct component can be calculated as an arcus tangent of the quadrature component $i_q$ and the direct component $i_d$. Equations (2) give approximations of these components. Based on Equations (2), the ratio between the components can be reduced into a ratio between the stator resistance R and the product of the rotational speed $\omega$ of the rotor and the quadrature inductance component $L_q$ of the rotor. Thus, an approximation of the angle $\theta_{i,dq}$ can be calculated on the basis of this ratio as follows, for example:

$$\theta_{i,dq} = ATAN\left(\frac{i_q}{i_d}\right) = ATAN\left(\frac{R}{\omega L_q}\right). \quad (3)$$

The stator resistance R and the quadrature inductance component $L_q$ may be known before performing the first stage of the method according to the present disclosure. In some applications, these motor parameters may be determined with an identification run before the first stage, for example.

A increment representing the angle $\theta_{i,dq}$ between the stator current vector and its direct component in the rotor reference frame may be calculated on the basis of the ratio, and once the angle of the stator current is known, the increment may be added to the angle of the stator current to form an estimate of the angle of the rotor. Depending on the direction of the rotation of the rotor, the increment may have a positive or a negative sign. The initial value for the estimated angle offset may then be calculated on the basis of a difference between the estimated angle of the rotor and the rotor angle sensed with the angle sensor.

The rotational speed in Equation (3) may be small because the short-circuited permanent-magnet synchronous motor may rotate at a speed close to a zero speed (e.g. less than 5% of the nominal speed of the motor). As a result, the ratio between the stator resistance R and the product of the rotational speed $\omega$ and the quadrature inductance component $L_q$ is high. In Equation (3), as the ratio increases, the resulting angle approaches 90 degrees (from below). Because of the high ratio, differences between motor parameters of different motors become insignificant for the resulting angle. Therefore, instead of determining the motor parameters via an identification run, predetermined, typical values for motor parameters may be used in the calculation of the increment. A predetermined value may be used for the ratio between a direct component and a quadrature component. The increment may be given a predetermined value, e.g. 100 degrees, if the rotational speed can be assumed to remain close to the zero speed during the first stage.

Next, the second stage of the method according to the present disclosure is discussed in more detail. After the initial value for the estimated angle offset has been determined in the first stage, the second stage may be initiated. During the second stage, the value of the estimated angle offset is fine-tuned. The brake may be held open, and a speed controller may be used to control the rotational speed of the motor. The speed controller may use a zero-speed reference in order to hold the axle stationary. In an elevator system, for example, this means that the elevator car is held motionless. The speed control may output a torque reference for a torque controller.

While controlling the speed/torque, a value for a corrected rotor angle may be continuously or periodically calculated on the basis of the estimated angle offset and the rotor angle sensed with the angle sensor. The torque controller may control the torque of the motor to maintain the rotational speed of the motor at a zero speed while using the corrected rotor angle as feedback.

Because of the external torque acting on the axle (e.g. in the form of a torque caused by a counterweight that is heavier than an elevator car in an elevator system), the motor has to produce a counter-torque in order to maintain the axle motionless. To accomplish this, a frequency converter controlling the motor may have to supply the stator of the motor with a stator current. The magnitude of the stator current depends on the accuracy of the corrected angle feedback. When the angle feedback corresponds with the actual angle of the rotor, the magnitude of the stator current is at its minimum.

In order to find the minimum magnitude of the stator current, minor adjustments may be made to the value of the estimated angle offset while controlling the speed/torque. In this manner, the smallest magnitude of the stator current can be found, and the value of the angle offset corresponding to this magnitude may be used as the final estimated angle offset. There are various approaches for finding the minimum magnitude.

For example, in one embodiment, the angle offset may be given values that sweep a range around the initial value of the angle offset determined in the first stage. During the sweep, the magnitude of the present stator current may be compared with the magnitude of a smallest found stator current. On the basis of the comparison, the magnitude of the smallest found stator current and the value of the corresponding angle offset may be updated. If the smallest found stator current is smaller than the present stator current, the smallest found stator current and its corresponding angle offset remain unchanged. However, if the present magnitude of the stator current is smaller than the smallest stator current, new values for the smallest stator current and its angle offset are stored. When the whole range has been swept, the method knows the angle offset at which the minimum magnitude of the stator current is found.

In another embodiment, a range around the initial value of the angle offset is swept while storing a plurality of data points. Each data point may represent the magnitude of the stator current at an angle offset. A curve representing the magnitude of stator current as a function of the angle offset may then be calculated on the basis of the data points. The curve may be calculated by using a curve fitting algorithm, for example. The curve fitting algorithm may be the method of least squares, for example. Based on the curve, a value of the estimated angle offset minimizing the magnitude of the stator current can be determined.

In yet another embodiment, the second stage comprises adding two deviations with opposite signs but the same magnitude to a present value of the estimated angle offset. Magnitudes of stator currents may then be detected at the deviated angle offsets and stored. For example, the present value of the angle offset may be injected with a small deviation. The magnitude of the deviation may sway between two different-signed extremes so that the present value of the estimated angle offset with the deviation forms a sine curve centered at the present angle offset. Magnitudes of the stator current at the peak and bottom of the sine curve may be measured and stored, for example.

The stored magnitudes may be compared with each other, and if the magnitudes differ from each other more than a set limit, the present value of the angle offset may be updated to a new value on the basis of the comparison. The difference between the magnitudes tells the direction in which the angle offset should be adjusted. After updating the present value of the angle offset, the method may repeat the second stage by adding deviations to the updated value of the value angle offset. However, if the difference is smaller than the set limit, the present value of the angle offset may be used as the final angle offset.

The method and its embodiments may be implemented on a frequency converter, for example. The frequency converter may comprise means configured to carry out a method according to any one of preceding claims. The frequency converter may be configured to control the permanent-magnet synchronous motor and the method may be implemented on a control unit of the frequency converter, for example.

It is obvious to a person skilled in the art that the inventive concept can be implemented in various ways. The invention and its embodiments are not limited to the examples described above but may vary within the scope of the claims. Although the examples in the present disclosure discuss the method according to the present disclosure mainly in view of an elevator system, the method may also be used in other applications, as long as the system has separate braking means for preventing the rotation of the rotor of the electric motor and an external torque is induced onto the rotor after releasing the braking means.

The invention claimed is:

1. A method for estimating an angle offset of an angle sensor in a system comprising a permanent-magnet synchronous motor configured to drive an axle, wherein the angle sensor is configured to sense a rotor angle of a rotor of the permanent-magnet synchronous motor, and a brake arranged such that when the brake is closed, the brake manually prevents the axle from rotating, and when the brake is open, the axle is free to rotate, wherein the method comprises a first stage and then a second stage;

wherein the first stage comprises:
controlling stator phases of the motor to the same potential in order to short-circuit the stator of the motor,
opening the brake,
determining an angle of a stator current of the motor in a stator reference frame, the stator current being induced by rotation of the axle caused by an external torque acting on the axle, and
determining an initial value for the angle offset on the basis of the determined angle of the stator current, wherein the second stage comprises:
determining a corrected rotor angle on the basis of the estimated angle offset and the rotor angle sensed with the angle sensor,
controlling the torque of the motor to maintain the rotational speed of the motor at a zero speed, wherein the control of the torque uses the corrected rotor angle as feedback,
making adjustments to the value of the estimated angle offset,
determining a value of the angle offset at which the stator current is at its smallest, and
using the determined value as a final estimated angle offset.

2. The method according to claim 1, wherein
the system is an elevator system comprising an elevator car and a counterweight suspended on a cable that passes via a drive sheave,
the permanent-magnet synchronous motor drives an axle of the drive sheave,
the brake is arranged to manually prevent the rotation of the axle of the drive sheave when closed, and
the elevator car and the counterweight have a weight difference between each other so that when the brake is opened, an external torque is induced onto the axle of the drive sheave.

3. The method according to claim 2, wherein determining the angle of the stator current in the first stage comprises using a phase locked loop to lock to the stator current, and determining the angle of the stator current in the stator reference frame with the phase locked loop.

4. The method according to claim 2, wherein determining the initial value in the first stage comprises:
calculating an increment on the basis of a ratio between a direct component and a quadrature component of the stator current in a rotor reference frame, wherein the ratio between a direct component and a quadrature component is approximated by a ratio between the stator resistance and a product of the rotational speed of the rotor and a quadrature inductance component of the rotor,
adding the increment to the angle of the stator current to form an estimate of the angle of the rotor, and
calculating the initial value for the estimated offset on the basis of a difference between the estimated angle of the rotor and the rotor angle sensed with the angle sensor.

5. The method according to claim 4, wherein a predetermined value is used for the ratio between a direct component and a quadrature component.

6. A method according to claim 2, wherein the second stage comprises:
sweeping a range around the initial value of the angle offset while storing a plurality of data points, each data point representing the magnitude of the stator current at an angle offset,
calculating a curve representing the magnitude of the stator current as a function of the angle offset on the basis of the data points, and
determining the value of the estimated angle offset on the basis of the curve.

7. A method according to claim 2, wherein the second stage comprises:
adding two deviations with opposite signs but the same magnitude to a present value of the estimated angle offset,
detecting magnitudes of stator currents at the deviated angle offsets, comparing the magnitudes, and
if the magnitudes differ from each other more than a set limit, adjusting the present value of the angle offset on the basis of the comparison, otherwise using the present value of the angle offset as the final angle offset.

8. The method according to claim 1, wherein determining the angle of the stator current in the first stage comprises using a phase locked loop to lock to the stator current, and
determining, the angle of the stator current in the stator reference frame with the phase locked loop.

9. The method according to claim 8, wherein determining the initial value in the first stage comprises:
calculating an increment on the basis of a ratio between a direct component and a quadrature component of the stator current in a rotor reference frame, wherein the ratio between a direct component and a quadrature component is approximated by a ratio between the stator resistance and a product of the rotational speed of the rotor and a quadrature inductance component of the rotor,
adding the increment to the angle of the stator current to form an estimate of the angle of the rotor, and
calculating the initial value for the estimated offset on the basis of a difference between the estimated angle of the rotor and the rotor angle sensed with the angle sensor.

10. The method according to claim 9, wherein a predetermined value is used for the ratio between a direct component and a quadrature component.

11. A method according to 8, wherein the second stage comprises:
sweeping a range around the initial value of the angle offset while storing a plurality of data points, each data point representing the magnitude of the stator current at an angle offset,
calculating a curve representing the magnitude of the stator current as a function of the angle offset on the basis of the data points, and
determining the value of the estimated angle offset on the basis of the curve.

12. A method according to claim 8, wherein the second stage comprises:
adding two deviations with opposite signs hut the same magnitude to a present value of the estimated angle offset,
detecting magnitudes of stator currents at the deviated angle offsets,
comparing the magnitudes, and
if the magnitudes differ from each other more than a set limit, adjusting the present value of the angle offset on the basis of the comparison, otherwise using the present value of the angle offset as the final angle offset.

13. The method according to claim 1, wherein determining the initial value in the first stage comprises:
calculating an increment on the basis of a ratio between a direct component and a quadrature component of the stator current in a rotor reference frame, wherein the ratio between a direct component and a quadrature component is approximated by a ratio between the stator resistance and a product of the rotational speed of the rotor and a quadrature inductance component of the rotor,
adding the increment to the angle of the stator current to form an estimate of the angle of the rotor, and
calculating the initial value for the estimated offset on the basis of a difference between the estimated angle of the rotor and the rotor angle sensed with the angle sensor.

14. The method according to claim 13, wherein a predetermined value is used for the ratio between a direct component and a quadrature component.

15. A method according to claim 13, wherein the second stage comprises:
sweeping a range around the initial value of the angle offset while storing a plurality of data points, each data point representing the magnitude of the stator current at an angle offset,
calculating a curve representing the magnitude of the stator current as a function of the angle offset on the basis of the data points, and
determining the value of the estimated angle offset on the basis of the curve.

16. A method according to claim 13, wherein the second stage comprises:
adding two deviations with opposite signs but the same magnitude to a present value of the estimated angle offset,
detecting magnitudes of stator currents at the deviated angle offsets,
comparing the magnitudes, and
if the magnitudes differ from each other more than a set limit, adjusting the present value of the angle offset on the basis of the comparison, otherwise using the present value of the angle offset as the final angle offset.

17. The method according to claim 1, wherein the second stage comprises: sweeping a range around the initial value of the angle offset, and, during the sweep, comparing the magnitude of the present stator current with the magnitude of a smallest found stator current, and updating the magnitude of the smallest found stator current and the value of the estimated angle offset at which it is found on the basis of the comparison.

18. A method according to claim 1, wherein the second stage comprises:
sweeping a range around the initial value of the angle offset while storing a plurality of data points, each data point representing the magnitude of the stator current at an angle offset,
calculating a curve representing the magnitude of the stator current as a function of the angle offset on the basis of the data points, and
determining the value of the estimated angle offset on the basis of the curve.

19. A method according claim 1, wherein the second stage comprises:
adding two deviations with opposite signs but the same magnitude to a present value of the estimated angle offset,
detecting magnitudes of stator currents at the deviated angle offsets,
comparing the magnitudes, and
if the magnitudes differ from each other more than a set limit, adjusting the present value of the angle offset on the basis of the comparison, otherwise using the present value of the angle offset as the final angle offset.

20. A frequency converter comprising:
a system including a permanent-magnet synchronous motor configured to drive an axle, wherein an angle sensor is configured to sense a rotor angle of a rotor of the permanent-magnet synchronous motor, and a brake arranged such that when the brake is closed, the brake manually prevents the axle from rotating, and when the brake is open, the axle is free to rotate, wherein the system comprises a first stage and then a second stage;

wherein the first stage is configured to
control stator phases of the motor to the same potential in order to short-circuit the stator of the motor,
open the brake,
determine an angle of a stator current of the motor in a stator reference frame, the stator current being induced by rotation of the axle caused by an external torque acting on the axle, and
determine an initial value for the angle offset on the basis of the determined angle of the stator current,
wherein the second stage is configured to:
determine a corrected rotor angle on the basis of the estimated angle offset and the rotor angle sensed with the angle sensor,
control the torque of the motor to maintain the rotational speed of the motor at a zero speed, wherein the control of the torque uses the corrected rotor angle as feedback,
make adjustments to the value of the estimated angle offset,
determine a value of the angle offset at which the stator current is at its smallest, and
use the determined value as a final estimated angle offset.

\* \* \* \* \*